United States Patent Office 3,667,827
Patented June 6, 1972

3,667,827
ASTRONOMICAL TELE-OBJECTIVE
Lawrence Monari, 1458 83rd St., Brooklyn, N.Y. 11228
Filed Mar. 16, 1971, Ser. No. 124,678
Int. Cl. G02b 17/00, 23/02
U.S. Cl. 350—55
18 Claims

ABSTRACT OF THE DISCLOSURE

A tele-objective is presented in which the diffraction effects produced by the central obstruction affecting the image quality are very small. Plane and spherical optical surfaces are the only ones used. A relatively small positive achromatic doublet provides correction of aberrations of a concave spherical primary mirror. The tele-objective is compact and has a long effective focal length. The tele-objective can be used advantageously in a telescopic apparatus by the addition of a field lens.

This invention relates to tele-objectives. More particularly, this invention relates to tele-objectives having small angular field as may be employed for photography and visual observations in the field of astronomy.

It is an object of this invention to provide a new and improved tele-objective.

It is well known that the image of a star, for example, even in a perfectly made telescope, is not a point but a small circular disk of light. In the ideal case, where there are no obstructions in the optical path (as in a refractor or off axis reflector) this central disk will contain 84% of the light energy from a star, the remaining 16% being spread into a system of concentric rings. The disk and rings together are called the diffraction pattern. The diffraction pattern is modified as successively larger central obstructions (such as a secondary mirror) are placed in the light path. The most important effect of enlarging the central obstruction is that less energy goes into the central disk and more into the rings. The result is a decrease in contrast with subsequent degradation of image quality.

Accordingly, another object of the invention is to provide a tele-objective in which the diffraction effects produced by the central obstruction affecting the image quality are very small.

Plane and spherical surfaces are the only ones which can be produced at sufficiently low cost for most practical purposes.

Accordingly, another object of the invention is to provide a tele-objective in which only lower cost and more easily manufactured plane and spherical reflecting and refracting surfaces are utilized.

The main advantage of a primary mirror is its complete freedom from chromatic aberration. Optical objectives having a spherical primary mirror are now well known. Hitherto, it has been found that some of the image defects introduced as a result of the spherical primary mirror can be appreciably eliminated by means of a large corrector lens component. Such large corrector lens components are relatively expensive and often difficult to manufacture.

Accordingly, another object of this invention is to provide a tele-objective having a spherical primary mirror and a relatively small lens means corrector component.

Another object of the invention is to provide a tele-objective in which spherical aberration, coma, chromatic aberration and spherochromatic aberration are corrected to a high degree.

The above and other objects are achieved by constructing a tele-objective according to this invention.

Basically, the tele-objective is made up of a spherical concave primary mirror, a relatively small first plano diagonal mirror, a lens means of positive power and another but larger second plano diagonal mirror. The arrangement being such that light rays, reflected from the concave primary mirror on to the first plano diagonal mirror, and from the latter through the lens means on to the second plano diagonal mirror, are reflected from the latter to, and come to focus on the system image plane.

It is to be understood that the terms "front" and "rear" as herein used refer to the ends of the objective respectively nearer the longer and shorter conjugates thereof.

In accordance with another aspect of the invention, the tele-objective is combined with a field lens to form a telescopic apparatus which is advantageously used for astronomical observations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
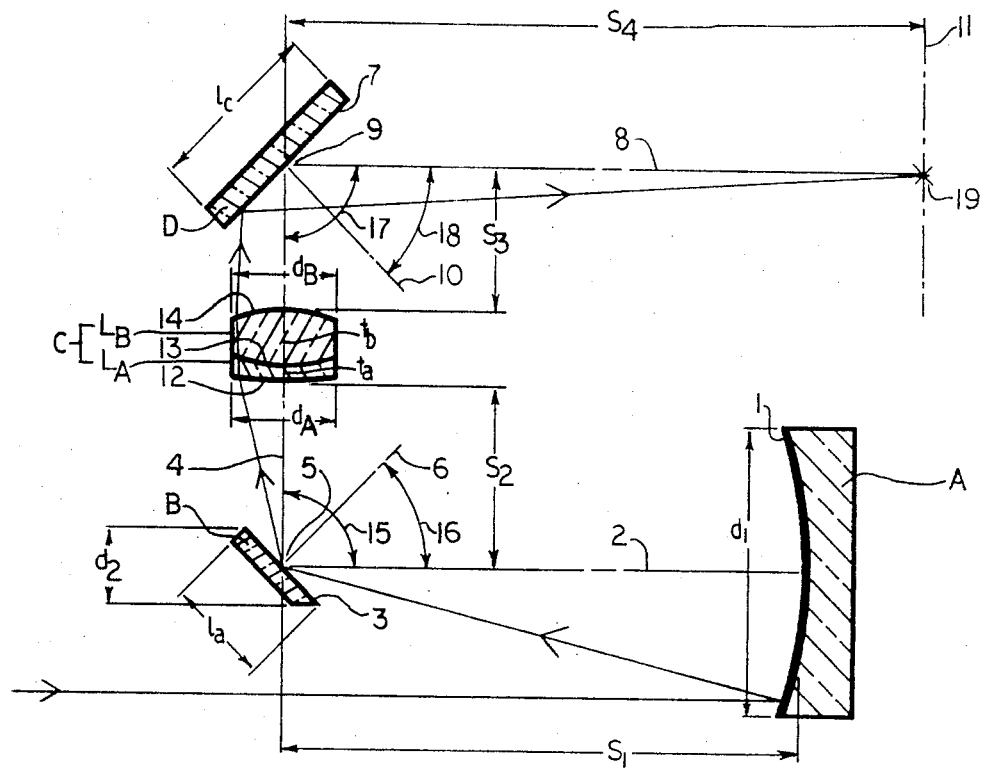
FIG. 1 is a longitudinal sectional side view of a tele-objective according to a preferred embodiment of the invention.

Referring now to the drawings, and more particularly to FIG. 1, a tele-objective provided in accordance with the invention, comprises a primary mirror A, a first diagonal mirror B, a cemented doublet lens means C, and a second diagonal mirror D.

The first plano diagonal mirror B is located physically in front of the concave primary mirror A and optically behind the concave primary mirror A. The doublet lens means C is located physically above the first plano diagonal mirror B and optically behind the first plano diagonal mirror B. The second plano diagonal mirror D is located physically above the doublet lens means C and optically behind the doublet lens means C. The tele-objective system image plane 11, is located optically and physically behind the second plano diagonal mirror D.

The primary mirror A, has spherical reflecting surface 1 concave to the front. Longitudinal axis 2 is the optical axis of primary mirror A. Diagonal mirror B, has plano reflecting surface 3. Lens C is an achromatic cemented doublet of positive power. Transverse axis 4 and longitudinal axis 2 intersect at point 5. In the preferred embodiment item 15, the angle between transverse axis 4 and longitudinal axis 2, is 90°. Item 6 is the normal to plano reflecting surface 3 at point 5. Accordingly, item 16, the angle between longitudinal axis 2 and normal 6, is 45°. Diagonal mirror D, has plano reflecting surface 7. In the preferred embodiment, longitudinal axis 8, is parallel to longitudinal axis 2. Transverse axis 4 and longitudinal axis 8 intersect at point 9. In the preferred embodiment, item 17, the angle between transverse axis 4 and longitudinal axis 8, is 90°. Item 10 is the normal to plano reflecting surface 7 at point 9. Accordingly, item 18, the angle between longitudinal axis 8 and normal 10, is 45°. Longitudinal axis 8 and image plane 11 intersect at axial point 19.

In other embodiments, not shown, the angle 17 between transverse axis 4 and longitudinal axis 8 is greater than 90°. Accordingly, item 18, the angle between longitudinal axis 8 and normal 10, is greater than 45°.

Primary mirror A is circular. Primary mirror A has diameter $d_1$. In the preferred embodiment plano diagonal mirror B is rectangular in shape. The long and the short sides of the rectangle have lengths $l_a$ and $l_b$ respectively.

The ratio of the length of the long side to the length of the short side is 1:0.707. Consequently, plano reflecting surface 3 has rectangular boundaries. Point 5 is located on surface 3 at the geometrical center of said boundaries. As shown in the drawing, the bottom edge of diagonal mirror B is beveled at 45° relative to plano reflecting surface 3 and parallel to longitudinal axis 2 so that the projection of diagonal mirror B onto the central portion of primary mirror A is a square having sides equal to $0.707 l_a$ or $l_b$. Consequently, dimension $d_2$ is equal to $0.707 l_a$ and $l_b$ is equal to dimension $d_2$. The above relationship can be expressed mathematically as follows:

$$0.707 l_a = l_b = d_2$$

Accordingly, diagonal mirror B is a central obstruction.

In other embodiments, not shown, the tele-objective is exactly similar to that described above, except the plano diagonal mirror B is elliptical in shape, the lengths of the major and minor axis of its plano reflecting surface being equal to $l_a$ and $l_b$ respectively and the edges of the diagonal mirror being beveled at 45° to its reflecting surface and parallel to longitudinal axis 2 so that the projection of the diagonal mirror B onto the center of the primary mirror is a circle having a diameter equal to $l_b$. Elliptical diagonal mirrors diffract light more uniformly but are more costly to manufacture than rectangular ones.

In the preferred embodiment lens means C is an achromatic cemented doublet comprised of lens elements $L_A$ and $L_B$. $L_A$ is the front lens element. $L_B$ is the rear lens element. Lens element $L_A$ air surface 12 is concave to the rear. Lens element $L_B$ air surface 14 is convex to the rear. Item 13 is the intersurface of the cemented doublet, and is concave to the rear. Lens element $L_A$ has a thickness $t_A$ and lens element $L_B$ has a thickness $t_B$. The diameters $d_A$ and $d_B$ of the lens elements $L_A$ and $L_B$ are equal. Surfaces 12, 13, and 14 are spherical.

In other embodiments, the tele-objective is exactly similar to that described above, except the doublet elements $L_A$ and $L_B$ are very slightly separated by a small air space to further reduce the residual spherical aberration of the tele-objective. In addition, adjustment of the air separation between elements $L_A$ and $L_B$ can be made during assembly of the tele-objective to correct small amounts of spherical aberration introduced by deviations in the focal length of primary mirror A within practical and convenient manufacturing tolerances previously imposed by the designer. For this purpose a microscope is focused on the image plane and a point shaped image is observed while the axial positions of elements $L_A$ and $L_B$ are separately adjusted without changing the position of the image plane. When the circle of confusion is a minimum spherical aberration of the tele-objective is fully corrected.

In other embodiments, not shown, lens means C is an achromatic cemented doublet comprised of front and rear elements wherein the front lens element air surface is convex to the rear, the rear lens element air surface is convex to the rear, and the intersurface of contact is concave to the rear.

In the preferred embodiment diagonal mirror D is rectangular. The long and the short sides of the rectangle have lengths $l_c$ and $l_d$ respectively. The ratio of the long side to the short side is 1:0.707. This relationship can be expressed mathematically as follows:

$$0.707 l_c = l_d$$

Accordingly, plano reflecting surface 7 has rectangular boundaries. Point 9 is located on surface 7 at the geometrical center of said boundaries.

Plano reflecting surface 3 and spherical reflecting surface 1 are separated by axial distance or air space $S_1$. Lens element $L_A$ air surface 12 and plano reflecting surface 3 are separated by axial distance or air space $S_2$. Plano reflecting surface 7 and lens element $L_B$ air surface 14 are separated by axial distance or air space $S_3$. System image plane 11 and plano reflecting surface 7 are separated by axial distance or air space $S_4$.

The arrangement is such that light rays indicated by the arrowed lines and being parallel to longitudinal axis 2, are incident to the primary mirror A on its surface 1, are reflected at surface 1 so as to be incident to the diagonal mirror B on its surface 3, are reflected at surface 3 so as to be incident to doublet lens C on its refracting surface 12. The rays are successively refracted at surfaces 13 and 14 in that order, and so become incident to diagonal mirror D on its surface 7, are reflected at surface 7 so as to form an image at axial point 19 on system image plane 11.

It is well known that the diffraction effects produced by a centrally obscuring secondary mirror or prism affecting the image quality in a reflecting telescope are very small if the dimensions of the projection of the central obstruction onto the primary mirror are smaller than 10% of the diameter of the primary mirror.

Diagonal mirror B is a central obstruction. In the preferred embodiment length $l_a$ is equal to or less than 10% of $d_1$, and greater than zero. This relation may be mathematically expressed as follows:

$$0 < l_a \leq 0.1 d_1$$

Consequently, the diffraction effects produced by diagonal mirror B affecting the image quality are very small.

The largest angular field of view without vignetting is obtained when the focal length of the primary mirror is equal to the axial separation $S_1$. Accordingly, in the preferred embodiment the focal plane of the primary mirror A is located within a short distance optically behind or in front of the diagonal mirror B. The axial separation $S_1$ between surfaces 1 and 3 is expressed mathematically as follows:

$$f - 0.5 l_a \leq S_1 \leq f + 0.5 l_a$$

wherein $f$ is the focal length of the primary mirror A.

In the preferred embodiment the angular field of view of the tele-objective expressed in radians is equal to $0.707 l_a$ divided by $f$. This relation may be mathematically expressed as follows:

$$G = \frac{0.707 l_a}{f}$$

wherein G is the angular field of view of the tele-objective expressed in radians.

It is desirable that diameter $d_A$ be kept small to lower the cost and to facilitate the manufacture of lens means C. Accordingly, axial separation $S_2$ is kept small and lens means C is positioned optically in front of diagonal mirror D.

In the preferred embodiment axial separation $S_2$ is greater than or equal to 50% of the sum of $d_1$ and $1.414 l_a$. This relation may be mathematically expressed as follows:

$$0.5 (d_1 + 1.414 l_a) \leq S_2$$

Consequently, all light rays entering the tele-objective within the angular field of view G, do so unobstructed by lens C. Accordingly there is no diffraction of light rays entering the tele-objective by lens C.

In the preferred embodiment the diameter $d_A$ is expressed mathematically as follows:

$$0.5 \frac{d_1^2}{f} \leq d_A$$

Light rays reflected at surface 3 so as to be incident to doublet C are refracted by doublet C without vignetting by doublet C, and the diameter $d_A$ of doublet C can be selected to be much smaller than primary mirror diameter $d_1$.

In the preferred embodiment $l_c$ and $S_3$ are expressed mathematically as follows:

$$1.414 d_A \leq l_c$$
$$0.5 d_A \leq S_3$$

objective image plane is located a short distance behind the primary mirror.

A tele-objective according to one embodiment of the invention is constructed substantially according to the specifications in the following table:

| Elements | Surf. # | Radius | Thicknesses $t$, Separations $s$ | Index $n_d$ Abbe # | Diam. $d$, Length $l$ |
|---|---|---|---|---|---|
| A | 1 | −54.0 | | $n_d$=1 (air) | $d_1$=6.0 |
|   |   |       | $s_1$=−26.8 | $n_d$=+1 (air) | |
| B | 3 | ∞ | | | $l_a$=0.283 |
|   |   |   | $s_2$=+3.1 | $n_d$=+1 (air) | $l_b$=0.2 |
| $L_A$ | 12 | +34.2374 | | $n_d$=+1.74077 | |
|   |   |   | $t_a$=+.10333 | $v_d$=27.60 | $d_A$=1.0 |
|   | 13 | +1.0104 | | | |
|   | 13 | +1.0104 | | | |
| $L_B$ |    |         | $t_b$=+.25832 | $n_d$=+1.60323 | $d_B$=1.0 |
|   | 14 | −1.2414 | | $v_d$=42.48 | |
|   |    |         | $s_3$=+1.0 | $n_d$=+1 (air) | $l_c$=1.414 |
| D | 7 | ∞ | | | $l_d$=1.0 |
|   |   |   | $s_4$=−14.737 | $n_d$=+1 (air) | |

Light rays refracted by doublet C so as to be incident to diagonal mirror D are reflected by diagonal mirror D without vignetting by diagonal mirror D, and the length $l_c$ of diagonal mirror D can be selected to be much smaller than primary mirror diameter $d_1$.

In the present invention the spherical aberration and coma of the spherical primary mirror A are corrected by the achromatic doublet C. The power of the achromatic doublet C is positive. Spherical aberration and coma are corrected by bending the doublet C, by suitably selecting the refractive index of each of its glass elements $L_A$ and $L_B$ and by suitably selecting the axial distance $S_2$ between plano reflecting surface 3 and refractive surface 12 of lens C. The chromatic aberration of the doublet is corrected by suitable selection of Abbe V-number for each of its glass elements $L_A$ and $L_B$. Sphero-chromatic aberration of the tele-objective is corrected by suitably modifying the axial color correction of the system to undercorrect the shorter wavelengths.

In a preferred embodiment Schott's SF13 and BASF5 glasses are used for elements $L_A$ and $L_B$ respectively. In another preferred embodiment Schott's SF3 and BASF5 glasses are used for elements $L_A$ and $L_B$ respectively. These glass combinations have particularly good characteristics suitable for correcting the above aberrations in the present invention.

Another purpose of doublet C is to provide a compact tele-objective with long effective focal length. The long effective focal length gives a large image scale. Doublet C forms a real laterally magnified image at 11 of the real image formed near diagonal mirror B by primary mirror A. The lateral magnification is equal to the effective focal length of the tele-objective divided by the focal length of the primary mirror A. This relation can be expressed mathematically as follows:

$$M = \frac{F}{f}$$

wherein M is the lateral magnification, and F is the effective focal length of the tele-objective. Consequently, the image at 11 is M times as large as the image formed by primary mirror A near diagonal mirror B.

The primary purpose of plano diagonal mirror D is to position the system image plane 11 closer to the primary mirror end of the tele-objective. Consequently, the tele-objective is more compact and the system image plane is more conveniently located for photography or visual observations. In the preferred embodiment, the tele- A tele-objective constructed in accordance with the above table, has an effective focal length of 134.716 inches, and an axial distance from lens surface 14 to image plane 11 of 15.737 inches, a relative aperture of 1:27.75, and a total fully illuminated angular field of view of 0.007407 radian. The relation between the effective focal length F of the tele-objective and the quantities given in the table above can be expressed mathematically as follows:

$$F = \frac{1}{QU + VX}$$

wherein $$Q = W_1(1+Z_1W_2) + W_2$$
$$U = 1 + Z_3W_4 + Z_2[W_3(1+Z_3W_4) + W_4]$$
$$V = Z_1W_1 + 1$$
$$X = W_3(1+Z_3W_4) + W_4$$

$$W_1 = \frac{2}{R_1}$$

$$W_2 = \frac{1 - (n_d)_{L_A}}{R_{12}}$$

where $R_{12}$=radius of surf. #12

$$W_3 = \frac{(n_d)_{L_A} - (n_d)_{L_B}}{R_{13}}$$

where $R_{13}$=radius of surf. #13

$$W_4 = \frac{(n_d)_{L_B} - 1}{R_{14}}$$

where $R_{14}$=radius of surf. #14

$$Z_1 = S_2 - S_1$$

$$Z_2 = \frac{t_a}{(n_d)_{L_A}}$$

$$Z_3 = \frac{t_b}{(n_d)_{L_B}}$$

and where $(n_d)_{L_A}$=index of refraction of element $L_A$ for a wavelength of 5876 angstroms.

$(n_d)_{L_B}$=index of refraction of element $L_B$ for a wavelength of 5876 angstroms.

If the previous example is based on the effective focal length, the following table is obtained:

| Elements | Surf. # | Radius | Thicknesses $t$, Separations $s$ | Index $n_d$, Abbe # | Diam. $d$, Length $l$ |
|---|---|---|---|---|---|
| A | 1 | −.40084F | | $n_d=1$ (air) | $d_1=.0445F$ |
|   |   |   | $s_1=-.19893F$ | $n_d=+1$ (air) | |
|   |   |   |   |   | $l_a=.0021F$ |
| B | 3 | ∞ | | | $l_b=.0014F$ |
|   |   |   | $s_2=+.02301F$ | $n_d=+1$ (air) | |
|   | 12 | +.25414F | | $n_d=+1.74077$ | |
| $L_A$ |   |   | $t_a=+.00076F$ | $v_d=27.60$ | $d_A=.10074F$ |
|   | 13 | +.00750F | | | |
|   | 13 | +.00750F | | $n_d=+1.60323$ | |
| $L_B$ |   |   | $t_b=+.00191F$ | $v_d=42.48$ | $d_B=.0074F$ |
|   | 14 | −.009214F | | | |
|   |   |   | $s_3=+.00742F$ | $n_d=+1$ (air) | |
|   |   |   |   |   | $l_c=.0104F$ |
| D | 7 | ∞ | | | $l_d=.0074F$ |
|   |   |   | $s_4=-.1096F$ | $n_d=+1$ (air) | |

A tele-objective according to another embodiment of the invention is constructed substantially according to the specifications in the following table:

| Elements | Surf. # | Radius | Thicknesses $t$, Separations $s$ | Index $n_d$, Abbe # | Diam. $d$, Length $l$ |
|---|---|---|---|---|---|
| A | 1 | −54.0 | | $n_d=1$ (air) | $d_1=6.0$ |
|   |   |   | $s_1=-26.8$ | $n_d=+1$ (air) | |
|   |   |   |   |   | $l_a=0.283$ |
| B | 3 | ∞ | | | $l_b=0.2$ |
|   |   |   | $s_2=+3.1$ | $n_d=+1$ (air) | |
|   | 12 | +32.0433 | | $n_d=+1.74000$ | |
| $L_A$ |   |   | $t_A=+.10333$ | $v_d=28.20$ | $d_A=1.0$ |
|   | 13 | +1.0083 | | | |
|   | 13 | +1.0083 | | $n_d=+1.60323$ | |
| $L_B$ |   |   | $t_B=+.25832$ | $v_d=42.48$ | $d_B=1.0$ |
|   | 14 | −1.2445 | | | |
|   |   |   | $s_3=+1.0$ | $n_d=+1$ (air) | |
|   |   |   |   |   | $l_c=1.414$ |
| D | 7 | ∞ | | | $l_d=1.0$ |
|   |   |   | $s_4=-14.629$ | $n_d=+1$ (air) | |

A tele-objective constructed in accordance with the above table has an effective focal length of 134.12 inches and an axial distance from lens surface 14 to image plane 11 of 15.629 inches, a relative aperture of 1:27.55, and a total fully illuminated angular field of view of 0.007407 radian.

If the previous example is based on the effective focal length, the following table is obtained:

| Elements | Surf. # | Radius | Thicknesses $t$, Separationses $s$ | Index $n_d$, Abbe # | Diam. $d$, Length $l$ |
|---|---|---|---|---|---|
| A | 1 | −.4026F | | $n_d=1$ (air) | $d_1=.044736F$ |
|   |   |   | $s_1=.19982F$ | $n_d=+1$ (air) | |
|   |   |   |   |   | $l_a=.00211F$ |
| B | 3 | ∞ | | | $l_b=.0014F$ |
|   |   |   | $s_2=+.02311F$ | $n_d=+1$ (air) | |
|   | 12 | +.238915F | | $n_d=+1.74000$ | |
| $L_A$ |   |   | $t_a=+.00077F$ | $v_d=28.20$ | $d_A=.0074F$ |
|   | 13 | +.007517F | | | |
|   | 13 | +.007517F | | $n_d=+1.60323$ | |
| $L_B$ |   |   | $t_b=+.00192F$ | $v_d=42.48$ | $d_B=.0074F$ |
|   | 14 | −.009279F | | | |
|   |   |   | $s_3=+.00745F$ | $n_d=+1$ (air) | |
|   |   |   |   |   | $l_c=.0105F$ |
| D | 7 | ∞ | | | $l_d=.0074F$ |
|   |   |   | $s_4=-.1091F$ | $n_d=+1$ (air) | |

In the above tables the radii, thicknesses, separations, and diameters are given in inches. The index of refraction is for a wavelength of 5876 angstroms. As is well known in the art, a plus sign is used to denote that a surface is convex optically to the front and that a distance is measured from left to right whereas a minus sign is used to denote that a surface is concave to the front and that a distance is measured from right to left.

Figure 2:
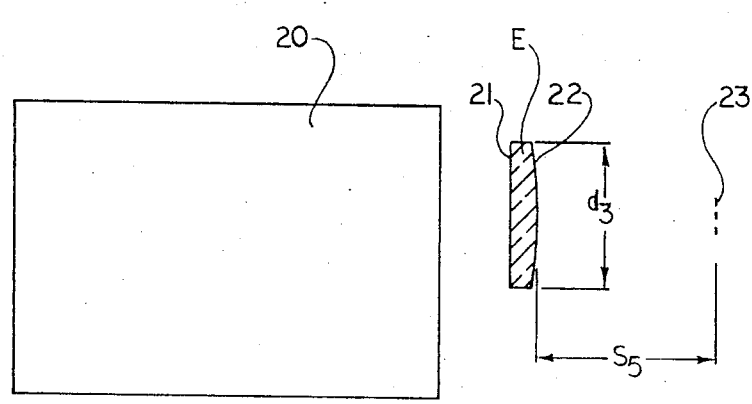
FIG. 2 is a diagrammatic view illustrating a telescopic apparatus according to one embodiment of the invention.

The tele-objective according to the present invention is advantageously used in the telescopic apparatus shown in FIG. 2. A field lens E conveniently being a single element having front and rear air surfaces 21 and 22 respectively, wherein surface 21 is plano and surface 22 is convex to the rear, is placed in a position in which its plano surface 21 is located and aligned in the image plane of a tele-objective 20 which is illustrated in detail in FIG. 1. Rays focused in the system image plane are successively refracted at surfaces 21 and 22 in that order and so become incident to the system exit pupil 23. Consequently, an object at which the tele-objective is directed, for example the moon, or a planet, can be observed on surface 21 by an observer whose eye is located at exit pupil 23. The axial separation $s_5$ between surface 22 and exit pupil 23 is the eye relief of the telescopic apparatus. The eye relief $s_5$ is approximately equal to and slightly greater than K the focal length of the field lens E.

When drawing lunar and planetary maps, for example, an especially long eye relief of 10 inches (the normal viewing distance of the human eye) or more is advantageous, as this enables the observer to see both his drawing and the field of view at a glance without having to move his head. Accordingly, in the preferred embodiment, K the focal length of the field lens E is selected to be greater than or equal to 10 inches.

In other embodiments the focal length of the field lens E is greater than or equal to 4 inches, (the near point of the human eye). The diameter of field lens E is $d_3$ and is expressed mathematically as follows:

$$d_3 = GF$$

Consequently, the entire field of view of the tele-objective can be observed on surface 21.

For various well known physiological and psychological reasons individuals accommodate more so to viewing objects about ten inches away without restriction of peripheral vision, as with the present invention, than having to focus the eye to infinity with accompanying restrictions on peripheral vision as with ordinary eyepieces generally having relatively short eye reliefs. In addition it is well known that objects subtending equal angles at the observer's eye but viewed in the context of different surroundings and distances can appear to be larger or smaller psychologically. Objects subtending equal angles at the observer's eye but viewed on and relative to the field lens in the context of the present invention appear larger than when viewed in an ordinary eyepiece or as predicted by geometrical optics.

It will be understood that each of the elements described above, or two or more together, may also find a useful application in other types of tele-objectives differing from the types described above.

Although embodiments of the invention have been described and shown with some degree of detail, it is not wished to limit the invention to the particular embodiments shown, but to limit it only in accordance with the scope of the appended claims since persons skilled in the art may devise other embodiments which are still within the limitations of said claims.

What is claimed as new and desired to be secured by Letters Patent is:

1. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at 45° to said transverse optical axis, and axially airspaced from said lens means, said first diagonal mirror having a substantially rectangularly shaped plano reflecting surface having long and short sides having lengths equal to $l_a$ and $l_b$ respectively, said length $l_a$ being less than or equal to 10% of said primary mirror diameter, said lens means being an achromatic cemented doublet of positive power comprising a front element and a rear element, the air surface of said front element being spherical and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane.

2. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror as follows:

$$f - 0.5l_a \leqslant s_1 \leqslant f + 0.5l_a$$

wherein
$f$ = the focal length of said primary mirror;
$l_a$ = the length of the long side of rectangularly shaped plano reflecting surface of said first diagonal mirror;
$s_1$ = the axial air separation between the plano reflecting surface of said first diagonal mirror and the spherical reflecting surface of said primary mirror;

said lens means being aligned along a transverse optical axis and axially airspaced from said first diagonal mirror as follows:

$$0.5(d_1 + 1.414l_a) \leqslant s_2$$

wherein
$d_1$ = the diameter of said primary mirror;
$s_2$ = the axial air separation between said lens means and the plano reflecting surface of said first diagonal mirror;

said second diagonal mirror having a plano reflecting surface inclined at 45° to said transverse optical axis, and axially airspaced from said lens means, said first diagonal mirror having a substantially rectangularly shaped plano reflecting surface having long and short sides having lengths equal to $l_a$ and $l_b$ respectively, said length $l_a$ being less than or equal to 10% of said primary mirror diameter, said lens means being an achromatic cemented doublet of positive power comprising a front element and a rear element, the air surface of said front element being spherical and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane, the effective focal length of said tele-objective is expressed mathematically as follows:

$$F = Mf$$

wherein
$F$ = the effective focal length of said tele-objective;
$M$ = the lateral magnification of said lens means.

3. A tele-objective as set forth in claim 2 wherein said front lens element and said rear lens element consist of Scott's SF13 and BASF5 glasses respectively.

4. A tele-objective as set forth in claim 2 wherein said front lens element and said rear lens element consist of Schott's SF13 and BASF5 glasses respectively.

5. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at less than 45° to said transverse optical axis, and axially airspaced from said lens means, said first diagonal mirror having a substantially rectangularly shaped plano reflecting surface having long and short sides having lengths equal to $l_a$ and $l_b$ respectively, said length $l_a$ being less than or equal to 10% of said primary mirror diameter, said lens means being an achromatic airspaced doublet of positive power comprising a front element and a rear element, the front air surface of said front element being spherical and concave to the rear, the rear air surface of said rear element being spherical and convex to the rear, the rear surface of said front element and the front surface of said rear element both being very slightly separated by an airspace, both being of equal curvature and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane, wherein the axial positions of said front element and said rear element of said lens means are separately adjusted without changing the position of said image plane so that the circle of confusion is reduced to a minimum.

6. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror as follows:

$$f-0.5l_a \leqslant s_1 \leqslant f+0.5l_a$$

wherein $f$=the focal length of said primary mirror;
$l_a$=the length of the long side of rectangularly shaped plano reflecting surface of said first diagonal mirror;
$s_1$=the axial air separation between the plano reflecting surface of said first diagonal mirror and the spherical reflecting surface of said primary mirror;

said lens means being aligned along a transverse optical axis and axially airspaced from said first diagonal mirror as follows:

$$0.5(d_1+1.414l_a) \leqslant s_2$$

wherein $d_1$=the diameter of said primary mirror;
$s_2$=the axial air separation between said lens means and the plano reflecting surface of said first diagonal mirror;

said second diagonal mirror having a plano reflecting surface inclined at 45° to said transverse optical axis, and axially airspaced from said lens means, said first diagonal mirror having a substantially rectangularly shaped plano reflecting surface having long and short sides having length equal to $l_a$ and $l_b$ respectively, said length $l_a$ being less than or equal to 10% of said primary mirror diameter, said lens means being an achromatic airspaced doublet of positive power comprising a front element and a rear element, the front air surface of said front element being spherical and concave to the rear, the rear air surface of said rear element being spherical and convex to the rear, the rear surface of said front element and the front surface of said rear element both being very slightly separated by an airspace, both being of equal curvature and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane, wherein the axial positions of said front element and said rear element of said lens means are separately adjusted without changing the position of said image plane so that the circle of confusion is reduced to a minimum.

7. A tele-objective as set forth in claim 6 wherein said front lens element and said rear lens element consist of Schott's SF3 and BASF5 glasses respectively; wherein said front lens element and said rear lens element have diameters expressed mathematically as follows:

$$0.5 \frac{d_1^2}{f} \leqslant d_A = d_B$$

wherein $f$=the focal length of said primary mirror;
$d_1$=the diameter of said primary mirror;
$d_A$=the diameter of said front element of said lens means;
$d_B$=the diameter of said rear element of said lens means;

the angular field of view of the tele-objective is expressed mathematically as follows:

$$G = \frac{0.707 l_a}{f}$$

wherein $G$=the angular field of view of said tele-objective expressed in radians;
$l_a$=the length of the long side of said rectangularly shaped plano reflecting surface of said first diagonal mirror.

8. A tele-objective as set forth in claim 6 wherein said front lens element and said rear lens element consist of Schott's SF13 and BASF5 glasses respectively.

9. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis and axially airspaced from said primary mirror, said lens means being aligned along a transverse optical axis and axially airspaced from said first diagonal mirror, said second diagonal mirror having a plano reflecting surface inclined at 45° to said transverse optical axis, and axially airspaced from said lens means, said first diagonal mirror having a substantially rectangularly shaped plano reflecting surface having long and short sides having lengths equal to $l_a$ and $l_b$ respectively, said lens means being an achromatic cemented doublet of positive power comprising a front element and a rear element, the air surface of said front element being spherical, and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane.

10. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at 45° to said transverse optical axis and axially airspaced from said lens means, said first diagonal mirror having a substantially rectangularly shaped plano reflecting surface having long and short sides having lengths equal to $l_a$ and $l_b$ respectively, said lens means being an achromatic airspaced doublet of positive power comprising a front element and a rear element, the front air surface of said front element being spherical and concave to the rear, the rear air surface of said rear element being spherical and convex to the rear, said rear surface of said front element and the front surface of said rear element both being very slightly separated by an airspace, both being of equal curvature and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane a short distance behind said primary mirror, wherein the axial positions of said front element and rear element of said lens means are separately adjusted without changing the position of said image plane so that the circle of confusion is reduced to a minimum.

11. A tele-objective comprising in combination a primary mirror, a first diagonal mirror, a lens means, and a second diagonal mirror, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at 45° to said transverse optical axis, and axially airspaced from said lens means, said first diagonal mirror having a substantially elliptically shaped plano reflecting surface having major and minor axes having lengths equal to $l_a$ and $l_b$ respectively, said length $l_a$ being less than or equal to 10% of said primary mirror diameter, said lens means being an achromatic cemented doublet of positive power comprising a front element and a rear element, the air surface of said front element being spherical and convex to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spheromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane a short distance behind said primary mirror.

12. A telescopic apparatus comprising in combination a primary mirror, a first diagonal mirror, a lens means, a second diagonal mirror, and a field lens, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at 45° to said transverse optical axis, and axially airspaced from said lens means, said first diagonal mirror having a substantially rectangularly shaped plano reflecting surface having long and short sides having lengths equal to $l_a$ and $l_b$ respectively, said length $l_a$ being less than or equal to 10% of said primary mirror diameter, said lens means being an achromatic cemented doublet of positive power comprising a front element and a rear element, the air surface of said front element being spherical and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane are successively refracted at said field lens front and rear surfaces in that order and so become incident to the system exit pupil, said field lens having a focal length greater than or equal to ten inches; said field lens being a singlet having front and rear air surfaces, said front surface being plano and said rear surface being convex to the rear, said field lens having said plano front surface located in said image plane wherein the image of an object at which said tele-objective is directed as viewed by an observer on said field lens appears to be larger for psychlological reasons than in an ordinary eyepiece or as predicted by geometrical optics, said telescopic apparatus having an eye relief greater than or equal to ten inches.

13. A telescopic apparatus comprising in combination a primary mirror, a first diagonal mirror, a lens means, a second diagonal mirror, and a field lens, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror as follows:

$$f-0.5l_a \leq s_1 \leq f+0.5l_a$$

wherein $f=$ the focal length of said primary mirror;
$l_a=$ the length of the long side of rectangularly shaped plano reflecting surface of said first diagonal mirror;
$s_1=$ the axial air separation between the plano reflecting surface of said first diagonal mirror and the spherical reflecting surface of said primary mirror;

said lens means being aligned along a transverse optical axis and axially airspaced from said first diagonal mirror as follows:

$$0.5(d_1+1.414l_a) \leq s_2$$

wherein $d_1=$ the diameter of said primary mirror;
$s_2=$ the axial air separation between said lens means and the plano reflecting surface of said first diagonal mirror;

said second diagonal mirror having a plano reflecting surface inclined at less than 45° to said transverse optical axis, and axially airspaced from said lens means, said first diagonal mirror having a substantially rectangularly shaped plano reflecting surface having long and short sides having lengths equal to $l_a$ and $l_b$ respectively, said length $l_a$ being less than or equal to 10% of said primary mirror diameter, said lens means being an achromatic cemented doublet of positive power comprising a front element and a rear element, the air surface of said front element being spherical and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane are successively refracted at said field lens front and rear surfaces in that order and so become incident to the system exit pupil, said field lens being a singlet having front and rear air surfaces, said front surface being plano and said rear surface being convex to the rear, said field lens having said plano front surface located in said image plane, wherein the image of an object at which said tele-objective is directed as viewed by an observer on said field lens appears to be larger for psychological reasons than in an ordinary eyepiece or as predicted by geometrical optics, said field lens having a focal length greater than or equal to ten inches; said telescopic apparatus having an eye relief greater than or equal to ten inches.

14. A telescopic apparatus comprising in combination a primary mirror, a first diagonal mirror, a lens means, a second diagonal mirror, and a field lens, said primary mirror having a spherical reflecting surface concave to the front, said primary mirror being aligned along a longitudinal optical axis, said first diagonal mirror having a plano reflecting surface inclined at 45° to said longitudinal optical axis, and axially airspaced from said primary mirror, said lens means being aligned along a transverse optical axis and axially airspaced from said first diagonal mirror, said second diagonal mirror having a plano reflecting surface inclined at less than 45° to said transverse optical axis, and axially airspaced from said lens means, said first diagonal mirror having a substantially rectangularly shaped plano reflecting surface having long and short sides having lengths equal to $l_a$ and $l_b$ respectively, said lens means being an achromatic cemented doublet of positive power comprising a front element and a rear element, the air surface of said front element being spherical and concave to the rear, the air surface of said rear element being spherical and convex to the rear, the intersurface of contact between said front and rear elements being spherical and concave to the rear, the character of said lens means being such so as to correct the spherical aberration and coma of said primary mirror, said lens means being corrected for chromatic and spherochromatic aberration, the arrangement being such that parallel light rays which are incident to said primary mirror are reflected by said primary mirror to be incident to said first diagonal mirror are reflected by said first diagonal mirror to be incident to said lens means are refracted by said lens means to be incident to said second diagonal mirror are reflected by said second diagonal mirror to be incident to and brought to a focus on the system image plane are successively refracted at said field lens front and rear surfaces in that order and so become incident to the system exit pupil, said field lens being a singlet having front and rear air surfaces, said front surface being plano and said rear surface being convex to the rear, said field lens having said plano front surface located in said image plane, wherein the image of an object at which said tele-objective is directed as viewed by an observer on said fields lens appears to be larger for psychological reasons than in an ordinary eyepiece or as predicted by geometrical optics, said field lens having a focal length greater than or equal to four inches; said telescopic apparatus having an eye relief greater than or equal to four inches.

15. A tele-objective constructed substantially according to the specifications in the following table:

| Elements | Surf. # | Radius | Thicknesses $t$, Separations $s$ | Index $n_d$, Abbe # | Diam. $d$, Length $l$ |
|---|---|---|---|---|---|
| A | 1 | −54.0 |  | $n_d=1$ (air) | $d_1=6.0$ |
|  |  |  | $s_1=-26.8$ | $n_d=+1$ (air) | $l_a=0.283$ |
| B | 3 | ∞ |  |  | $l_b=0.2$ |
|  |  |  | $s_2=+3.1$ | $n_d=+1$ (air) |  |
|  | 12 | +34.2374 |  | $n_d=+1.74077$ |  |
| L$_A$ |  |  | $t_a=+.10333$ | $v_d=27.60$ | $d_A=1.0$ |
|  | 13 | +1.0104 |  |  |  |
|  | 13 | +1.0104 |  |  |  |
|  |  |  | $t_b=+.25832$ | $n_d=+1.60323$ |  |
| L$_B$ |  |  |  | $v_d=42.48$ | $d_B=1.0$ |
|  | 14 | −1.2414 |  |  |  |
|  |  |  | $s_3=+1.0$ | $n_d=+1$ (air) |  |
|  |  |  |  |  | $l_c=1.414$ |
| D | 7 | ∞ |  |  | $l_d=1.0$ | wherein said elements are designated by the characters A, B, $L_A$, $L_B$, and D have thicknesses $t$, diameters $d$, lengths $l$, and axial air separations $s$, wherein $t_a$ and $t_b$ designate the thicknesses of the elements $L_A$ and $L_B$, wherein $d_1$, $d_A$ and $d_B$ designate the diameters of the elements A, $L_A$, and $L_B$, respectively, wherein $s_1$, $s_2$ and $s_3$ designate the axial air separations between elements A and B, B and $L_A$, and $L_B$ and D, respectively, said first diagonal mirror B and second diagonal mirror D having substantially rectangularly shaped plano reflecting surfaces having long and short sides having lengths equal to $l_a$ and $l_b$, and $l_c$ and $l_d$, respectively, wherein the dimensions are inches, wherein the elements listed in the first column are arranged in order from the front to the rear optically, wherein the second column lists the surface numbers of the elements in the order in which the surfaces are impinged by rays of light, wherein the third column lists the radii of the surfaces of the elements in the order in which the surfaces are impinged by rays of light, wherein a plus sign is used to denote that a surface is convex to the front and that a distance is measured from left to right whereas a minus sign is used to denote that a surface is concave to the front and that a distance is measured from right to left, wherein the index of refraction is for a wavelength of 5876 angstroms, and ments A, $L_A$, and $L_B$, respectively, wherein $s_1$, $s_2$, and $s_3$ designate the axial air separations between elements A and B, B and $L_A$, and $L_B$ and D respectively, said first diagonal mirror B and second diagonal mirror D having substantially rectangularly shaped plano reflecting surfaces having long and short sides having lengths equal to $l_a$ and $l_b$, and $l_c$ and $l_d$, respectively, wherein the dimensions are inches, wherein the elements listed in the first column are arranged in order from the front to the rear optically, wherein the second column lists the surface numbers of the elements in the order in which the surfaces are impinged by rays of light, wherein the third column lists the radii of the surfaces of the elements in the order in which the surfaces are impinged by rays of light, wherein a plus sign is used to denote that a surface is convex to the front and that a distance is measured from left to right whereas a minus sign is used to denote that a surface is concave to the front and that a distance is measured from right to left, wherein the index of refraction is for a wavelength of 5876 angstroms, and wherein the effective focal length is 134.12 inches, the relative aperture is 1:27.55 and the total fully illuminated angular field of view is 0.007407 radian.

17. A tele-objective constructed substantially according to the specifications in the following table:

| Elements | Surf. # | Radius | Thicknesses $t$, Separations $s$ | Index $n_d$, Abbe # | Diam. $d$, Length $l$ |
|---|---|---|---|---|---|
| A | 1 | −.40084F | | $n_d=1$ (air) | $d_1=.0445F$ |
| | | | $s_1=−.19893F$ | $n_d=+1$ (air) | |
| B | 3 | ∞ | | | $l_a=.0021F$ |
| | | | $s_2=+.02301F$ | $n_d=+1$ (air) | $l_b=.0014F$ |
| $L_A$ | 12 | +.25414F | | $n_d=+1.74077$ | |
| | | | $t_a=+.00076F$ | $v_d=27.60$ | $d_A=.0074F$ |
| | 13 | +.00750F | | | |
| | 13 | +.00750F | | | |
| $L_B$ | | | $t_b=+.00191F$ | $n_d=+1.60323$ | $d_B=.0074F$ |
| | 14 | −.009214F | | $v_d=42.48$ | |
| | | | $s_3=+.00742F$ | $n_d=+1$ (air) | |
| D | 7 | ∞ | | | $l_c=.0104F$ |
| | | | | | $l_d=.0074F$ | wherein the effective focal length is 134.716 inches, the relative aperture is 1:27.75 and the total fully illuminated angular field of view is 0.007407 radian.

16. A tele-objective constructed substantially according to the specifications in the following table:

| Elements | Surf. # | Radius | Thicknesses $t$, Separations $s$ | Index $n_d$, Abbe # | Diam. $d$, Length $l$ |
|---|---|---|---|---|---|
| A | 1 | −54.0 | | $n_d=1$ (air) | $d_1=6.0$ |
| | | | $s_1=26.8$ | $n_d=+1$ (air) | |
| B | 3 | ∞ | | | $l_a=0.283$ |
| | | | $s_2=+.3.1$ | $n_d=+$ (air) | $l_b=0.2$ |
| $L_A$ | 12 | +32.0433 | | $n_d=+1.74000$ | |
| | | | $t_a=+.10333$ | $v_d=28.20$ | $d_a=1.0$ |
| | 13 | +1.0083 | | | |
| | 13 | +1.0083 | | | |
| $L_B$ | | | $t_b=+.25832$ | $n_d=+1.60323$ | $d_B=1.0$ |
| | 14 | −1.2445 | | $v_d=42.48$ | |
| | | | $s_3=+1.0$ | $n_d=+1$ (air | |
| D | 7 | ∞ | | | $l_c=1.414$ |
| | | | | | $l_d=1.0$ | wherein said elements are designated by the characters A, B, $L_A$, $L_B$, and D and have thicknesses $t$, diameters $d$, lengths $l$ and axial air separations $s$, where $t_a$ and $t_b$ designate the thicknesses of the elements $L_A$, and $L_B$, wherein $d_1$, $d_A$ and $d_B$ designate the diameters of the elements A, $L_A$, and $L_B$, respectively, wherein $s_1$, $s_2$, and $s_3$ designate the axial air separations between elements A and B, B and $L_A$, and $L_B$ and D, respectively, said first diagonal mirror B and second diagonal mirror D having substantially rectangularly shaped plano reflecting surfaces having long and short sides having lengths equal to $l_a$ and $l_b$, and $l_c$ and $l_d$, respectively, wherein F designates the effective focal length of the objective, wherein the elements listed in the first column are arranged in order from the front to the rear optically, wherein the second column lists the surface numbers of the elements in the order in which the surfaces are impinged by rays of light, wherein the third column lists the radii of the surfaces of the elements in the order in which the surfaces are impinged by rays of light, wherein a plus sign is used to denote that a surface is convex to the front and that a distance is measured from left to right whereas a minus sign is used to denote that a surface is concave to the front and that a distance is measured from right to left, wherein the index of refraction is for a wavelength of 5876 angstroms.

18. A tele-objective constructed substantially according to the specifications in the following table:

wherein $d_1$, $d_A$, and $d_B$ designate the diameters of the elements A, $L_A$, and $L_B$, respectively, wherein $s_1$, $s_2$ and $s_3$ designate the axial air separations between elements A and B, B and $L_A$, and $L_B$ and D, respectively, said first diagonal mirror B and second diagonal mirror D having substantially rectangularly shaped plano reflecting surfaces having long and short sides having lengths equal to $l_a$ and $l_b$, and $l_c$ and $l_d$, respectively, wherein F designates the effective focal length of the objective, wherein the elements listed in the first column are arranged in order from the front to the rear optically, wherein the second column lists the surface numbers of the elements in the order in which the surfaces are impinged by rays of light, wherein the third column lists the radii of the surfaces of the elements in the order in which the surfaces are impinged by rays of light, wherein a plus sign is used to denote that a surface is convex to the front and that a distance is measured from left to right whereas a minus

| Elements | Surf. # | Radius | Thicknesses $t$, Separations $s$ | Index $n_d$, Abbe # | Diam. $d$, Length $l$ |
|---|---|---|---|---|---|
| A | 1 | −.4026F | | $n_d$=1 (air) | $d_1$=.044736F |
|   |   |   | $s_1$=−.19982F | $n_d$=+1 (air) | $l_a$=.00211F |
| B | 3 | ∞ | | | $l_b$=.0014F |
|   |   |   | $s_2$=+.02311F | $n_d$=+1 (air) | |
|   | 12 | +.238915F | | $n_d$=+1.74000 | |
| $L_A$ |   |   | $t_a$=+.00077F | $v_d$=28.20 | $d_A$=.0074F |
|   | 13 | +.007517F | | | |
|   | 13 | +.007517F | | | |
| $L_B$ |   |   | $t_b$=+.00192F | $n_d$=+1.60323 | $d_B$=.0074F |
|   |   |   |   | $v_d$=42.48 | |
|   | 14 | −.009279F | | | |
|   |   |   | $s_3$=+.00745F | $n_d$=+1 (air) | $l_c$=.0105F |
| D | 7 | ∞ | | | $l_d$=.0074F | wherein said elements are designated by the characters A, B, $L_A$, $L_B$, and D and have thicknesses $t$, diameters $d$, lengths $l$ and axial air separations $s$, wherein $t_a$ and $t_b$ designate the thicknesses of the elements $L_A$ and $L_B$, sign is used to denote that a surface is concave to the front and that a distance is measured from right to left, wherein the index of refraction is for a wavelength of 5876 angstroms.

References Cited

UNITED STATES PATENTS 2,636,415  4/1953  Zobel.
2,898,831  8/1959  Smith et al. _____ 350—55 X
3,152,214  10/1964  Korones et al. _____ 350—28

OTHER REFERENCES

Heumann: "A 10-Inch Spherical Reflector with a Negative Correcting Lens" Sky and Telescope, vol. XXIV, No. 4, October 1962, pp. 231–235.

JOHN K. CORBIN, Primary Examiner

U.S. Cl. X.R.

350—27, 55, 202